June 2, 1931. A. I. LIBERMAN 1,808,669
PHOTOGRAPHIC CAMERA
Filed June 29, 1929 4 Sheets-Sheet 4
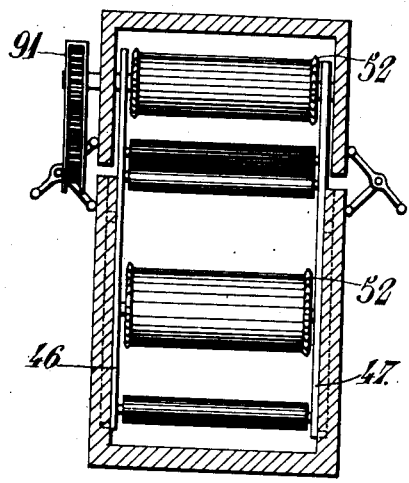
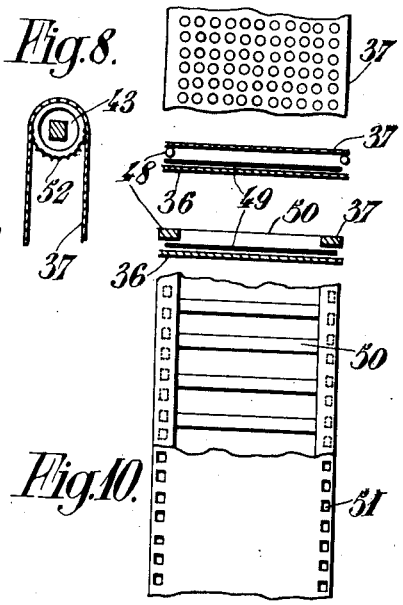
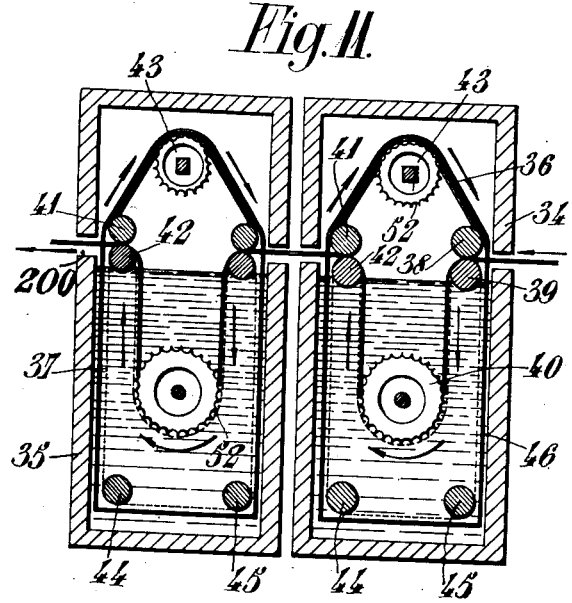
Inventor
Alexander I. Liberman
by Wilkinson & Giusta
Attorneys.

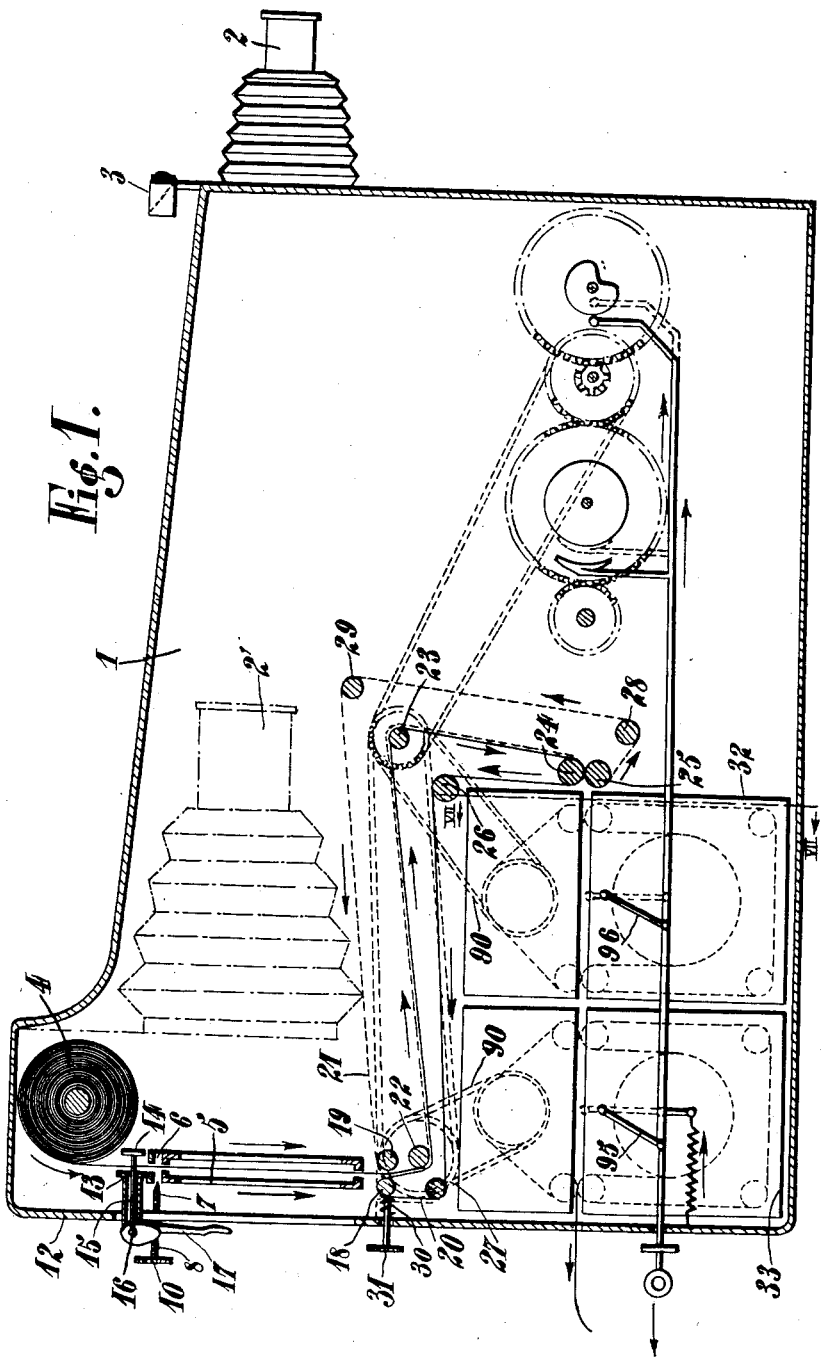

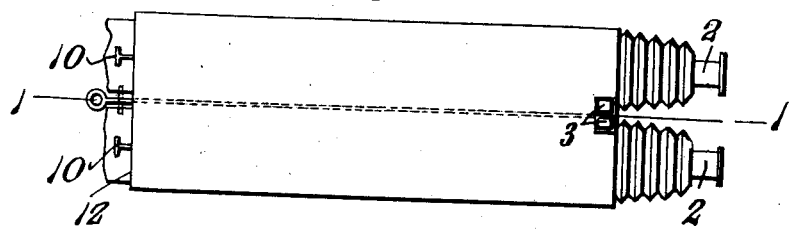
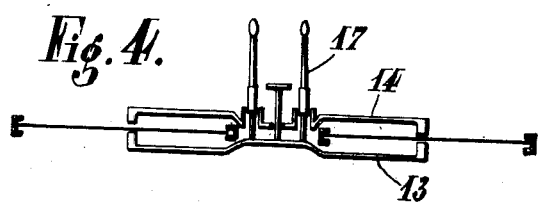
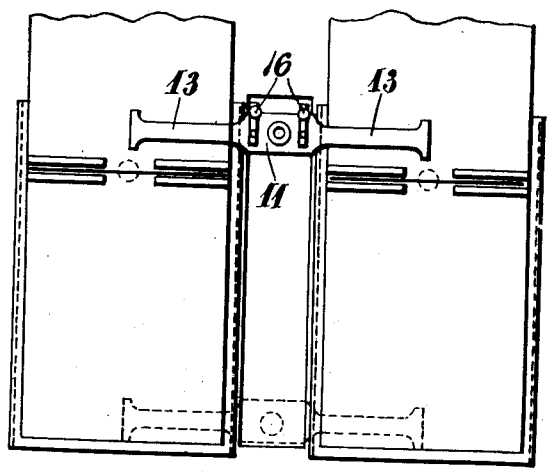
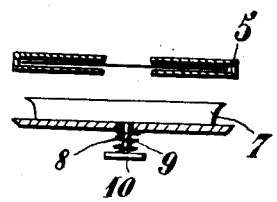

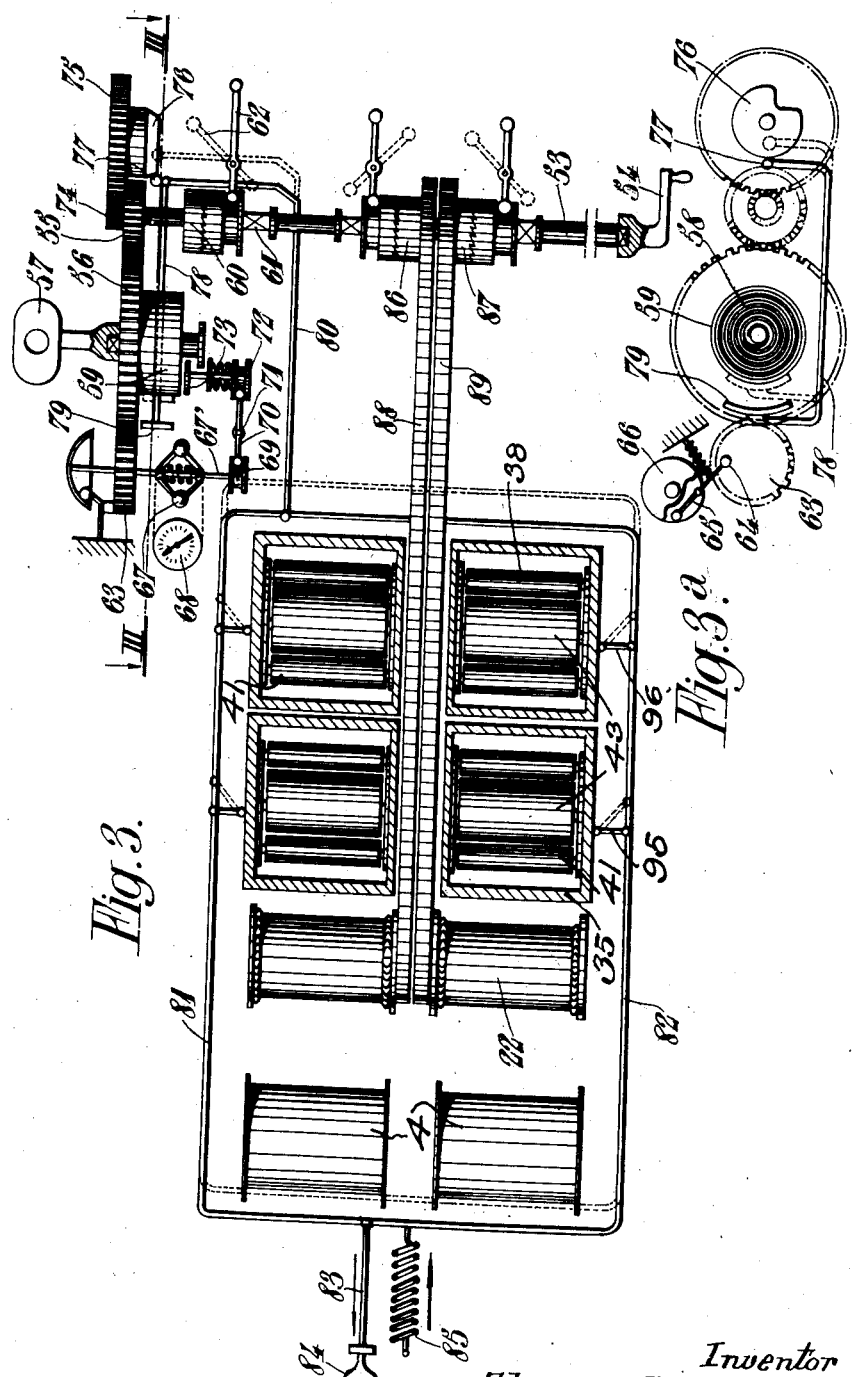

Patented June 2, 1931

1,808,669

UNITED STATES PATENT OFFICE

ALEXANDER IEZEKIL LIBERMAN, OF PARIS, FRANCE

PHOTOGRAPHIC CAMERA

Application filed June 29, 1929, Serial No. 374,647, and in France July 26, 1928.

The present invention relates to a photographic camera which can operate automatically or by hand, and with which negative or positive pictures or both can be immediately obtained at will, said camera containing suitable solutions for developing and fixing these two kinds of pictures.

Said positive or negative pictures can be taken on paper or on a film, at will.

Said camera comprises several double endless bands between which the pictures are engaged after exposure, in order to pass them through the camera and successively through the various solutions.

The endless bands are driven either by hand, or automatically by means of a clockwork mechanism.

For varying the speed of said clockwork mechanism the latter includes an adjustable governor.

The camera comprises two exposure taking and developing and fixing devices, arranged in parallel so as to allow of the simultaneous taking of two pictures, preferably one positive and the other negative.

A clutch system allows either one of these two devices to be operated alone, or both together, either by hand or automatically.

An alarm device, operated by the clockwork mechanism indicates the position of the pictures moving through the camera.

The clockwork mechanism is normally locked by a lever bearing in a recess of a rotating cam which rotates with the clockwork mechanism, the pulling of said lever releasing the cam and consequently the clockwork mechanism, said lever being normally pulled by a spring and pressing constantly against said cam and entering the recess therein to block the whole mechanism again on completion of an operation.

The movements of the lever releasing and blocking the clockwork mechanism at the same time causes the tanks containing the solutions to be opened and closed, by bringing the lower portions of said tanks nearer the upper portions through the medium of a set of links, thus enabling photographs to be taken breadthwise or lengthwise without spilling the liquid.

Each of the tanks containing the solutions includes a mechanism with rollers and endless bands, which automatically receives the film or the paper at the entrance to the tank, carries it into the solution and carries it out of the tank after it has passed through the solution.

The mechanism which causes the picture to move through each of said tanks is supported by the upper part of the latter.

The bands which carry the pictures through the solutions are such that the band on the emulsion side feeds the picture only along its edges, so as not to hinder the action of the solution.

The film and sensitized paper are stored within the camera on spools, a pair of hand operated pincers pulling the paper or the film to position it in a holder opposite the lens.

A hand operated knife cuts off the used portion of the film or the paper after exposure.

Other advantages and features of the invention will be apparent from the description which follows given in conjunction with the accompanying drawings which illustrate diagrammatically and by way of example one embodiment of the invention.

In the drawings:

Fig. 1 is a vertical section of the camera through line I—I of Fig. 2.

Fig. 2 is a top plan view of the camera.

Fig. 3 is a top plan view of the inner mechanism of the camera, the various members being shown in the same plane for the sake of clarity.

Fig. 3a is a section through the line III—III of Fig. 3.

Fig. 4 is a plan view and Fig. 5 is an elevation of the feeding mechanism for the unused film and paper.

Fig. 6 is a diagrammatical plan view of a knife for cutting off the film or the paper.

Fig. 7 is a fragmentary sectional view through the line VII—VII of Fig. 1.

Fig. 8 is a detail of Fig. 7 seen at right angles to the latter.

Fig. 9 shows a transverse sectional plan view of the feeding bands of the film or paper.

Fig. 10 is a similar view of a modification.

Fig. 11 is a section through XI—XI of Fig. 7.

The photographic camera as shown in the drawing is composed of a chamber 1 divided into two identical portions, as shown in Fig. 2. Each of these portions comprises a lens 2 and a view-finder 3. The following description of each of these two chambers applies equally to both, the said two chambers being identical, the controlling mechanism alone, of which mention will be made hereinafter, being common to the two chambers.

At the upper part of each chamber is placed a spool 4 on which is wound the unused film or paper for exposure, as the case may be. Said film descends into a holder 5 where it is exposed when the lens is uncovered. At the upper part of the holder 5, a slot 6 is provided into which may pass a knife 7 carried on a rod 8 normally held at a distance by a spring 9, said knife being arranged to cut the film when it is pushed down by depressing the knob 10. The cutting device is shown in greater detail in Fig. 6.

Above said holder 5 and knife 7 is furthermore placed a gripping device enabling a fresh length of film to be drawn down after the part exposed in the holder 5 has been cut off and fed through the remainder of the camera. Said device consists of a plate 11 (Fig. 5) which slides in the rear partition 12 of the camera and carries two arms 13, one for each of the two chambers of the camera. The paper or the film to be exposed is gripped between said arm 13 and another arm 14 which can be brought nearer the latter owing to its being carried by a rod 15 the end of which abuts against a cam 16, said cam being rotatable by means of a lever 17. On lifting the lever 17, the cam 16 pulls the rod 15 and forces the arm 14 against the arm 13 causing the unused sheet of paper or film to be held between the two arms. By causing the unit to slide in the partition 12 of the chamber so as to bring it into the position shown by the dotted line in Fig. 5, the film or paper is made to feed into the holder.

When said film or paper is thus brought into position, the lever 17 is lowered again so as to open the pincers formed by the two arms 13 and 14 and the device is raised again into place, as shown in full lines in Fig. 5. The device is then ready to bring down a fresh length of paper.

There are arms 13 and 14, as has been said above, for both sides of the camera, and, as may be seen, although they are moved together by the displacement of the plate 11, they can be gripped in one chamber and not in the other, due to their being actuated by independent levers 17. Consequently, film or paper may be fed down into one of the two chambers, without being fed down into the other, or may be fed down into the two simultaneously.

Below the holder 5 are placed two rollers 18 and 19 on each of which an endless band passes. The two endless bands 20 and 21 follow the path normally shown by the arrows, Fig. 1, of course when the mechanism is operating. After having run over the rollers 18 and 19, the two bands 20 and 21 unite to pass together on a roller 22, then on a roller 23, and finally on rollers 24 and 25 where they separate. The band 20 returns to the roller 18 passing over rollers 26 and 27, and the band 21 returns to the roller 19 passing over the rollers 28 and 29. All the rollers are mounted in fixed position in the camera except roller 18 which is capable of horizontal displacement. Said roller 18 is normally held against the roller 19 by a spring 30; it can be moved away from roller 19 because of the fact that it is mounted on a rod terminating in a knob 31. By pulling the knob 31, roller 18 is separated from roller 19, this operation taking place at the same time as the film is brought down by means of the gripping device formed by the arms 13 and 14. When the film is fed down, the knob 31 is pulled, the rollers 18 and 19 being thus separated and the end of the film engaging between the rollers. As the pincers formed by the arms 13 and 14 are released, the knob 31 is also released and the end of the film is then gripped between the rollers 18 and 19. When, eventually, the whole mechanism is in motion and the bands displaced by the rotating rollers 23, said bands will carry with them the portion of the film which has been cut by means of the knife 10; said portion of the film thus cut off and carried along by the bands, passes with them over the rollers 22 and 23 and comes out between the rollers 24 and 25. Said portion of the film then passes into the tanks 32 and 33 containing the developing and fixing solutions. Said tanks are shown in greater detail in Figures 7 and 11. Each of said tanks is in two parts, the upper part 34 fixed, and the lower part 35 movable, that is to say that it may be raised or lowered so as to come into contact with the upper part 34 of the tank.

Between the two portions 34 and 35 of the tanks, is gripped a resilient material 200 which forms a tight joint so that when the portion 35 is held against the portion 34, the liquid contained in the tank cannot escape therefrom, and the camera can be turned over in any direction.

Inside each tank is placed a mechanism for progressing the film or the paper through the tanks. Said device comprises two endless bands 36 and 37 which turn at the point where the film passes on to the rollers 38 and 39. Said bands move in the direction shown by the arrows, and coming together between the rollers 38 and 39, they take hold between them of the film which arrives at this point as mentioned above, and passing round the roller 40 they draw the film into the lower part of the tank, plunging it into the solution. The two bands then pass round the two rollers 41 and 42 where they separate releasing the film which is further engaged by rollers and a similar device in the next tank. From the rollers 41 and 42, the two bands return to the rollers 38 and 39, the band 36 passing over the roller 43 and the band 37 passing over the rollers 44 and 45. Roller 43 acts at the same time as a driving roller for the whole mechanism for it carries a driving pinion mounted on the same shaft outside the film. All the rollers mentioned above, that is to say 38 to 45, are mounted between two side plates 46 and 47 fixed to the upper part of the tank and hanging down freely in the lower part 35, so that said lower part can move up and down freely without carrying with it the different rollers and without putting them out of adjustment. It should be noted that the two driving bands which are provided to carry the exposed film to the tanks containing the solutions, that is to say the bands 20 and 21, may be of any type, but the bands 36 and 37 must be such as to allow the solution to act on the film they carry. This follows from the fact that one of the bands allows the liquid to pass freely over the film.

Two devices which enable this result to be attained are shown in Figures 9 and 10. In the case shown in Fig. 9, the band 36 is imperforate and the band 37 is perforated. Furthermore, said band 37 has beads 48 on its edges and the film 49 is gripped between said two beads and the band 36. The liquid can have access to all parts of the film through the perforations in the band 37 and, owing to the fact that said perforated part of the band is at some distance from said film, the liquid flows freely over the latter.

In the device shown in Fig. 10, there is also an imperforate band 36, a film 49 arranged on said band and a band 37 also having lateral beads 48, said beads being united by transverse bands 50 placed at some distance from the film and sufficiently spaced from the latter so that the liquid can flow freely over said film. The two bands 36 and 37 can moreover be perforated at their edges, as shown at 51, and the rollers 40 and 43 can also have on their edges serrations 52 engaging with the perforations 51 so as to provide a better feed of the bands (Fig. 8).

The tank 33 is arranged in exactly the same manner as the tank 32 and possesses the same parts; as it comes out of the tank 33, the film passes through a slot in the partition 12 and comes out of the camera as a finished picture, either negative or positive, according to whether film or paper was used and according to the solutions employed.

As has been mentioned above, each of the two chambers composing the camera has a device such as the one described above, said two devices being exactly similar. The feed of the film and the paper in the camera is obtained by means of the mechanism shown in greater detail in Figs. 3 and 3a. The said mechanism comprises a main driving shaft 53 which can be operated by hand by means of a handle 54 or automatically owing to the fact that it carries at its end a toothed wheel 55 actuated by another toothed wheel 56 which is constantly driven by a clockwork device of any known kind and not shown in detail on the drawing. The clockwork is wound up by means of a key 57 and has a spring 58 (Fig. 3a) housed in a drum 59 fixed to the wheel 56. The shaft 53 can be made to rotate or not with the clockwork by means of a toothed clutch 60 one of the members of which can be made to slide on a square portion 61 of the shaft 53 by means of a control lever 62. When said lever 62 is in the position shown by the dotted line, there is no connection between the toothed wheel 55 and the shaft 53. When, on the other hand, it is in the position shown by the full line, the two toothed members of the clutch 60 being engaged, the wheel 55 is coupled to the shaft 53.

The toothed wheel 56 also drives another toothed wheel 63 having a pin 64 which acts at each revolution on the end of the clapper 65 of a bell 66 so as to make it ring. On the spindle of said wheel 63 is furthermore fitted a governor 67 of any known type, which can be regulated in advance by means of a regulating device 68 also of any known type and which is not shown in detail.

According to the setting given, the governor comes into action at a predetermined speed so as to produce a braking effect when there is a tendency for said speed to be exceeded. This is achieved by mounting on the spindle 67' of the governor 67 a fork 69 which displaces a lever 70 pivoted at 71. When, under the action of the governor, said lever 70 begins to rotate, its other end, which is engaged in a fork 72 causes a brake 73 to act on the drum 59 so as to limit the movement of the latter and of the driving wheel 56 to which it is fixed. Lastly, the toothed wheel 55 drives, through a pinion 74, another toothed wheel 75 on which is fitted a circular cam 76. One end 77 of a rod 78 bears on said cam; said rod being constantly held against said cam by means of a spring of which mention will be made presently. When, by rotating, the recess of the cam comes opposite the head 77, the latter moves to the right, Fig. 3, and presses the brake 79 carried by said rod against the drum 59. Said brake is sufficiently powerful to bring the drum 59 to a standstill in spite of the force exerted by the clockwork.

On the rod 78 is fitted another rod 80 fixed to two other rods 81 and 82 passing on either side of the different devices provided in each of the two chambers and both fitted on another common rod 83 having a ring 84 at its end. A spring 85 tends constantly to push the linkage system, 80, 81, 82, 83 towards the right in the case shown in Fig. 3, and consequently, the rod 78 and the head 77 against the cam 76 as has been mentioned above.

The rods 81 and 82 each carry two links 95 and 96. Said links are pivotally mounted, on the one hand on said rods 80 and 81 and, on the other hand, on the lower part of the tanks containing the solutions. When the linkage system is displaced to the left, as shown in full lines in Fig. 1, said links enable the lower part 35 of the tanks to descend into the position shown in Fig. 1 and in Fig. 11. When, on the other hand, the linkage system is displaced to the right, as shown by the dotted line, the links are brought back into a vertical position lifting up the lower parts 35 of the tanks and pressing them against the upper parts 34, as has been described above.

The camera works in the following manner: One part of the film descends between the arms 13 and 14, the preceding portion of the film having been cut off by the knife 7, the two arms 13 and 14 are pressed against the film, as described above, and the plate 11 is brought down, so as to draw the film along and cause it to enter the holder 5. At the same time, the knob 31 is pulled, thus separating the two rollers 18 and 19 and the free end of the film engages between the two rollers. When the knob 31 is released, the film is gripped between the two rollers 18 and 19, it is then stretched in the holder 5 and the plate 11 is brought up again with the arms 13 and 14 so that the film is ready for another exposure. The desired photograph is taken in the ordinary way, the exposed part of the film is cut off by means of the knife 7 and the mechanism provided for carrying the exposed film into the solutions is set in motion. For this purpose, either the clutch 60 can be disengaged and the mechanism operated by hand by turning the handle 54, or the clutch 60 is left engaged and the knob 84 pulled.

By pulling said knob 84, in the case shown in the figure, all the rods 83, 81, 82, 80, 78 are moved to the left, the head 77 comes out of the recess of the cam 76 and the brake 79 is released from the drum 59. The clockwork then starts to operate and causes the wheels 56, 55, 63, 74 and 75 to rotate, thereby rotating the shaft 53 on which are mounted two clutches 86 and 87 similar to the clutch 60 and operating in the same manner. If said two clutches are engaged, the mechanisms of both the chambers are set in motion, if one only were engaged, only one of the mechanisms would be actuated.

The shaft 53 therefore drives through said clutches either one or the other or both the chains 88 and 89 which actuate the rollers 22 and 23 driving the two bands 20 and 21. In this way, the portion of the film which is gripped between the rollers 18 and 19 is drawn along and emerges between the rollers 24 and 25 to enter the tank 32. The rollers of the two tanks are also set in motion by means of the chains 90 driven by pinions carried on the rollers 22 and 23 and passing over the pinions 91 mounted on the same shafts as the rollers 43. The rollers and the bands of the tanks are therefore also set in motion. When the film emerges from between the rollers 24 and 25, it is seized by the rollers 38 and 39, drawn by the bands 36 and 37 into the solution, then into the other solution and is finally ejected from the camera as has already been described above. The different members are proportioned in such a manner that when the said operation is finished, the wheel 75 has made a complete revolution so that the cam 76 having returned to its original position, the head 77 falls back into the recess of said cam, thus stopping the clockwork and closing the tanks, as described above; the camera is then ready for another operation and, owing to the fact that the tanks are closed, can be handled in any direction.

The wheel 63 is, furthermore, of such size as to make three revolutions for one revolution of the wheel 75 and, at each of said three revolutions, by means of the pin 64 and the clapper 65, rings the bell, the ring of the bell being regulated in such a manner as to take place when the film reaches the entrance of each tank and when it is ejected from the camera. The three rings of the bell thus successively show that the film is entering each of the tanks or is about to leave the camera.

The camera, such as described above, can be either fixed, or portable; it can furthermore be made up of separate units, that is to say that the portion of the camera in which the pictures are taken can be separate from the rest of the camera, as shown by the dot and dash line in Fig. 1, so as to enable it to be separated and used in the manner of an ordinary camera. Said portion can then be fitted on to the unit formed by the chamber 1 so as to form a complete camera, such as described above.

The camera according to the invention can be used to take simultaneously, according to the nature of the ingredients employed, a positive and a negative picture, that is to say that it is possible to see immediately, after a few seconds, the results of the photograph taken, thus enabling the required number of prints to be made from the negative, if desired. The camera may, however, also be used to obtain simultaneously two negatives and two positives, if desired.

As has also been indicated above, it is possible to vary the time of immersion of the pictures in the solutions so as to subject them to its action for a longer or shorter time, according to the nature desired and according to the lighting when the exposure was taken.

It should be understood that the above camera has been described and illustrated in the drawing in a purely explanatory and in no way limitative manner and that it may include any modifications which do not depart from the spirit of the invention.

I claim:

1. In an automatic photographic camera capable of taking positive or negative pictures or both simultaneously, the combination of two photographing chambers, two developing chambers for developing, respectively, the negative and positive pictures, a displaceable slide member including two pairs of arms adapted to grip between them the two films to be photographed, means including two cams for selectively operating said arms to grip or release the films, said slide member when displaced progressing gripped film through said photographing chambers, a knife common to both said photographing chambers for severing portions of film, independently acting means for feeding film to said developing chambers, and means for selectively operating said means for feeding film to the developing chambers.

2. In an automatic photographic camera capable of taking positive or negative pictures or both simultaneously, the combination of two photographing chambers, two developing chambers for developing, respectively, the negative and positive pictures, selectively operated means for feeding film through said photographing chambers, means for severing the films prior to displacement thereof through the photographing chambers, means including rollers and endless bands driven thereby, for conveying the films to the developing chambers, clockwork mechanism including a revolving drum, for rotating said rollers, selectively operated clutches between said rollers and said clockwork mechanism for selecting the film to be progressed towards said developing chambers, a governor driven by said clockwork mechanism, and a brake controlled by said governor to act on said revolving drum.

3. In an automatic photographic camera adapted to take positive or negative pictures or both simultaneously, the combination of two photographing chambers, means comprising a displaceable member carrying two pairs of adjustably spaced film gripping arms, for displacing selected film through said photographing chambers, two developing chambers in which the negative and positive pictures are respectively developed, means including a clockwork mechanism and selectively operated endless belts for conveying film from the photographing to the developing chambers, means common to both said photographing chambers for severing film contained therein, a cam driven by said clockwork mechanism, a braking member periodically operated by said cam to stop said clockwork mechanism and connections from the clock mechanism to cause the clock to operate the belts, including clutch means for selectively operating the endless belts.

ALEXANDER IEZEKIL LIBERMAN.